(12) United States Patent
Holbrook

(10) Patent No.: US 8,155,835 B2
(45) Date of Patent: *Apr. 10, 2012

(54) VEHICLE CHASSIS HEIGHT ADJUSTMENT METHOD AND SYSTEM

(75) Inventor: Gregory A. Holbrook, Zionsville, IN (US)

(73) Assignee: Driveright Holdings, Ltd., Dublin (IE)

( * ) Notice: Subject to any disclaimer, the term of this patent is extended or adjusted under 35 U.S.C. 154(b) by 1032 days.

This patent is subject to a terminal disclaimer.

(21) Appl. No.: 12/035,257

(22) Filed: Feb. 21, 2008

(65) Prior Publication Data

US 2009/0216403 A1 Aug. 27, 2009

(51) Int. Cl.
*B60G 17/00* (2006.01)

(52) U.S. Cl. ........... 701/37; 280/6.151; 280/6.153

(58) Field of Classification Search .......... 701/37–39; 280/3.153–6.157

See application file for complete search history.

(56) References Cited

U.S. PATENT DOCUMENTS

| | | | |
|---|---|---|---|
| 2,956,816 A * | 10/1960 | Pribonic | 267/64.19 |
| 3,836,161 A | 9/1974 | Buhl | |
| 3,917,295 A | 11/1975 | Hiruma | |
| 3,917,307 A | 11/1975 | Shoebridge | |
| 4,396,202 A | 8/1983 | Kami et al. | |
| 4,630,840 A | 12/1986 | Masuda et al. | |
| 4,641,843 A | 2/1987 | Morrisroe, Jr. | |
| 4,700,303 A | 10/1987 | Tokuyama et al. | |
| 4,709,934 A | 12/1987 | Suzuki et al. | |
| 4,712,776 A | 12/1987 | Geno et al. | |
| 4,718,650 A | 1/1988 | Geno | |
| 4,718,695 A | 1/1988 | Kawagoe | |
| 4,733,876 A | 3/1988 | Heider et al. | |
| 4,746,133 A | 5/1988 | Hanser et al. | |
| 4,783,089 A | 11/1988 | Hamilton et al. | |
| 4,798,369 A | 1/1989 | Geno et al. | |
| 4,829,436 A | 5/1989 | Kowalik et al. | |
| 4,852,861 A | 8/1989 | Harris | |
| 4,903,209 A | 2/1990 | Kaneko | |
| 4,923,210 A | 5/1990 | Heider et al. | |
| 4,939,655 A | 7/1990 | Majeed et al. | |
| 4,948,166 A | 8/1990 | Kaneko | |
| 4,971,360 A | 11/1990 | Pischke et al. | |
| 5,025,877 A | 6/1991 | Assh | |
| 5,047,938 A | 9/1991 | Yokote et al. | |
| 5,058,017 A | 10/1991 | Adachi et al. | |
| 5,071,159 A | 12/1991 | Kamimura et al. | |
| 5,083,275 A | 1/1992 | Kawagoe et al. | |

(Continued)

FOREIGN PATENT DOCUMENTS

DE 94 03 229 U1 4/1994

(Continued)

OTHER PUBLICATIONS

Accelerometer Fundamentals, Document No. AN-00MX-001 from Memsic, Inc., North Andover, Massachusetts.

*Primary Examiner* — Paul N Dickson
*Assistant Examiner* — Timothy Wilhelm
(74) *Attorney, Agent, or Firm* — Fay Sharpe, LLP

(57) ABSTRACT

A method and system for adjusting a relative leveled height of a sprung mass of a vehicle to an unsprung mass of the vehicle. The method also includes receiving an input from an operator for incrementally/decrementally changing the height of the sprung mass. A system for performing the method is also disclosed.

15 Claims, 8 Drawing Sheets

U.S. PATENT DOCUMENTS

| | | | |
|---|---|---|---|
| 5,130,927 A | 7/1992 | Kunishima et al. | |
| 5,141,245 A | 8/1992 | Kamimura et al. | |
| 5,142,897 A | 9/1992 | Pischke et al. | |
| 5,161,579 A | 11/1992 | Anderson | |
| 5,176,391 A | 1/1993 | Schneider et al. | |
| 5,180,024 A | 1/1993 | Eto | |
| 5,184,841 A | 2/1993 | Pischke et al. | |
| 5,193,063 A | 3/1993 | Assh | |
| 5,216,364 A | 6/1993 | Ko et al. | |
| 5,220,505 A | 6/1993 | Yokote et al. | |
| 5,220,982 A | 6/1993 | Anderson | |
| 5,228,704 A | 7/1993 | Tabe | |
| 5,229,829 A | 7/1993 | Nihei et al. | |
| 5,267,466 A | 12/1993 | Morris | |
| 5,287,277 A | 2/1994 | Mine et al. | |
| 5,322,321 A | 6/1994 | Yopp | |
| 5,344,189 A | 9/1994 | Tanaka et al. | |
| 5,373,445 A | 12/1994 | Yopp | |
| 5,374,037 A | 12/1994 | Bledsoe | |
| 5,430,647 A | 7/1995 | Raad et al. | |
| 5,452,919 A | 9/1995 | Hoyle et al. | |
| 5,461,564 A | 10/1995 | Collins et al. | |
| 5,465,209 A | 11/1995 | Sammut et al. | |
| 5,499,845 A | 3/1996 | Geiger et al. | |
| 5,517,847 A | 5/1996 | Campbell et al. | |
| 5,530,648 A | 6/1996 | Lavey | |
| 5,560,591 A | 10/1996 | Trudeau et al. | |
| 5,642,043 A | 6/1997 | Ko et al. | |
| 5,652,703 A | 7/1997 | Kawazoe | |
| 5,696,678 A | 12/1997 | Raad et al. | |
| 5,707,045 A | 1/1998 | Easter | |
| 5,860,450 A | 1/1999 | Trudeau et al. | |
| 5,913,525 A | 6/1999 | Schneider et al. | |
| 6,050,573 A | 4/2000 | Kunz | |
| 6,098,967 A | 8/2000 | Folchert | |
| 6,098,995 A | 8/2000 | Danis | |
| 6,098,996 A | 8/2000 | Perlot | |
| 6,116,586 A | 9/2000 | Westerkamp et al. | |
| 6,173,974 B1 | 1/2001 | Raad et al. | |
| 6,176,495 B1 | 1/2001 | Decker | |
| 6,224,044 B1 | 5/2001 | Heilenkötter et al. | |
| 6,234,493 B1 | 5/2001 | Kleen et al. | |
| 6,260,860 B1 | 7/2001 | Brookes et al. | |
| 6,264,213 B1 | 7/2001 | Kutscher | |
| 6,314,353 B1 | 11/2001 | Ohsaku et al. | |
| 6,327,525 B1 | 12/2001 | Pauli et al. | |
| 6,332,623 B1 | 12/2001 | Behmenburg et al. | |
| 6,356,075 B1 | 3/2002 | Shank | |
| 6,369,583 B1 | 4/2002 | Sommer et al. | |
| 6,418,363 B2 | 7/2002 | Cochofel et al. | |
| 6,428,026 B1 | 8/2002 | Smith | |
| 6,431,557 B1 | 8/2002 | Terborn et al. | |
| 6,470,248 B2 | 10/2002 | Shank et al. | |
| 6,471,196 B2 | 10/2002 | Stiller | |
| 6,584,385 B1 | 6/2003 | Ford et al. | |
| 6,663,114 B2 * | 12/2003 | Lamela et al. | 280/6.15 |
| 6,669,217 B2 | 12/2003 | Sorum et al. | |
| 6,684,138 B1 | 1/2004 | Friede et al. | |
| 6,948,722 B2 | 9/2005 | Sproatt et al. | |
| 7,104,547 B2 | 9/2006 | Brookes et al. | |
| 7,261,304 B2 * | 8/2007 | Trudeau et al. | 280/6.153 |
| 7,744,099 B2 * | 6/2010 | Holbrook | 280/6.153 |
| 7,761,205 B2 * | 7/2010 | Onuma et al. | 701/36 |
| 2001/0003386 A1 | 6/2001 | Stiller | |
| 2001/0005803 A1 | 6/2001 | Cochofel et al. | |
| 2001/0017449 A1 | 8/2001 | Stiller | |
| 2002/0035423 A1 | 3/2002 | Shank et al. | |
| 2002/0079626 A1 | 6/2002 | Grotendorst et al. | |
| 2002/0096840 A1 * | 7/2002 | Sulzyc et al. | 280/5.514 |
| 2003/0023357 A1 | 1/2003 | Trudeau et al. | |
| 2003/0173750 A1 | 9/2003 | Sorum et al. | |
| 2004/0061293 A1 | 4/2004 | Barbison | |
| 2005/0161891 A1 | 7/2005 | Trudeau et al. | |
| 2007/0246902 A1 * | 10/2007 | Trudeau et al. | 280/6.16 |

FOREIGN PATENT DOCUMENTS

| | | |
|---|---|---|
| EP | 1 380 454 A1 | 1/2004 |
| FR | 2 640 206 A1 | 6/1990 |
| JP | 04 071918 A | 3/1992 |

* cited by examiner

VEHICLE CHASSIS HEIGHT ADJUSTMENT METHOD AND SYSTEM

BACKGROUND

The present disclosure broadly relates to air suspension systems and, more particularly, to an electronically controlled air suspension system for use in association with a stationary vehicle that adjusts the air springs of the stationary vehicle to vary the height of the vehicle chassis.

The present disclosure finds particular application in association with the use of larger mobile vehicles, such as cargo vehicles, recreational vehicles (RVs), travel trailers and over-the-road truck trailers, for example, and will be described herein with particular reference thereto. However, it is to be understood that such vehicles are simply exemplary structures and that the present disclosure is capable of broader application in association with the height adjustment of a wide variety of structures and vehicles. Further examples of such structures and vehicles include gun platforms, military and civilian personnel transport vehicles, and ambulances.

Many larger vehicles, such as cargo vehicles, RVs, travel trailers, over-the-road truck trailers and the like, have an air suspension system for regulating the height of the vehicle chassis relative to the supporting axles, in a manner that is dependent upon the load placed in the vehicle, to adjust the height of the chassis in response to the ride conditions experienced by the vehicle. In addition, as in the case of cargo vehicles, the height of the vehicle chassis may be adjusted by an operator to suit a variety of loading platforms at different heights. These suspension systems usually consist of a plurality of fluid suspension members, such as air springs, which support the vehicle chassis above the axles. The height of the air springs is controlled by the ingress and egress of pressurized fluid from a suitable source mounted on the vehicle, such as a compressor. One or more intervening valves are traditionally used to facilitate the ingress and egress of pressurized fluid respectively into and out of the air springs, thus adjusting the height of the air springs and correspondingly the position of the vehicle chassis relative to the vehicle axles. Such systems also enable the vehicle chassis to be maintained in an orientation substantially aligned with the axles while the vehicle is stationary. This is accomplished by individually regulating the heights of the air springs that support the vehicle chassis on the axles. To control the height of the vehicle chassis, the operator/driver usually activates a switch to adjust the chassis height to a predetermined height, such as the approximate loading platform height.

One disadvantage associated with the mere adjustment of the chassis height to a predetermined height is the circumstance where a loading platform height is not equivalent to the predetermined height. This scenario produces a vehicle chassis height which is above or below the loading platform height and produces a step which must be traversed to load and unload the vehicle.

This disclosure provides a means for incrementally adjusting the height of a chassis after a preselected height has been achieved. By incrementally/decrementally adjusting the chassis height, more accurate alignment of a loading platform and vehicle chassis can be achieved.

BRIEF DESCRIPTION

According to one exemplary embodiment, a method of adjusting a height of a vehicle is disclosed. The vehicle includes a sprung mass supported by a suspension system on an unsprung mass, the height of the suspension system selectively adjustable using a control system that is operable in a standard height adjustment mode in which the height of the sprung mass is adjusted to a first target height, relative to the unsprung mass, selected from one or more target heights, and an incremental/decremental height adjustment mode in which the height of the sprung mass is adjusted to a target height above or below a selected target height associated with the standard height adjustment mode. The method comprises a) entering the standard height adjustment mode; b) receiving a first target height datum which represents a sprung mass height relative to the unsprung mass; c) receiving actual height data from one or more height sensors operating connected to the sprung mass and unsprung mass for determining the height of the sprung mass relative to the unsprung mass; d) adjusting the sprung mass from the actual height to the first target height; e) entering the incremental/decremental height adjustment mode; f) receiving a first incremental/decremental target height datum which represents a target height above or below the first target height of the sprung mass relative to the unsprung mass; and g) adjusting the sprung mass to a second target height substantially equivalent to the sum of the first target height and the first incremental/decremental target height.

Another exemplary embodiment of this disclosure includes a vehicle suspension system operatively disposed between an associated sprung mass and an associated unsprung mass of an associated vehicle. The vehicle suspension system comprises a plurality of fluid suspension members supported between the associated sprung and unsprung masses; a pressurized fluid source in fluid communication with said plurality of fluid suspension members; a control device fluidically disposed between the pressurized fluid source and the plurality of fluid suspension members and operative to selectively transfer pressurized fluid therebetween. The vehicle suspension system also comprises one or more height sensors operatively connected between the associated sprung and unsprung masses and operative to output a signal indicative of a distance therebetween; a control system in communication with at least the control device and the one or more height sensors, the control system configured to operate the vehicle suspension system in a standard height adjustment mode and an incremental/decremental height adjustment mode. The standard height adjustment mode is configured to a) receive a first target height datum which represents a sprung mass height relative to the unsprung mass; b) receive actual height data from the one or more height sensors; and c) adjust the sprung mass from the actual height to the first target height by controlling the respective fluid suspension members. The incremental/decremental height adjustment mode is configured to d) receive a first incremental/decremental target height datum which represents a target height above or below the first target height at the sprung mass relative to the unsprung mass; and e) adjust the sprung mass to a second target height substantially equivalent to the sum of the first target height and the first incremental/decremental target height by controlling the respective fluid suspension members.

In another exemplary embodiment of this disclosure, a method of adjusting a height of a vehicle is disclosed. The method comprises adjusting the height of a vehicle that has a sprung mass supported by a suspension system on an unsprung mass, the height of the suspension system selectively adjustable using a control system that is operable in a standard height adjustment mode in which the height of the sprung mass is adjusted to a first target height, relative to the unsprung mass, selected from one or more predetermined target heights, and an incremental/decremental height adjustment mode in which the height of the sprung mass is adjusted to a predetermined incremental/decremental target height above or below, respectively, a selected predetermined target height associated with the standard height adjustment mode. The method comprises a) entering the standard height adjustment mode; b) receiving a first target height datum which represents a predetermined sprung mass height relative to the unsprung mass; c) receiving actual height data from one or more height sensors operatively connected to the sprung mass and unsprung mass for determining the height of the sprung mass relative to the unsprung mass; d) adjusting the sprung mass from the actual height to the first target height; e) entering the incremental/decremental height adjustment mode; f) receiving a first incremental/decremental target height datum which represents a predetermined target height above or below the first target height of the sprung mass relative to the unsprung mass; and g) adjusting the sprung mass to a second target height substantially equivalent to the sum of the first target height and the first incremental/decremental target height.

One feature of the methods and systems provided in this disclosure is the ability to optionally regulate the heights of the individual air springs in a particular sequence, such as initially adjusting for large magnitudes of unevenness by adjusting the air springs on one side of the vehicle, after which smaller magnitudes of height can be compensated for by individually adjusting either the front or rear air spring on the selected one side of the vehicle.

BRIEF DESCRIPTION OF THE DRAWINGS

Similar numerals refer to similar parts throughout the drawings.

DETAILED DESCRIPTION

It is to be understood that term chassis, as recited herein, generally refers to the sprung mass of the vehicle, which typically includes one or more of the components supported on the fluid suspension members. This can include, but is not limited to, a frame, a subframe, a floor and/or a body of the vehicle, for example.

Figure 1:
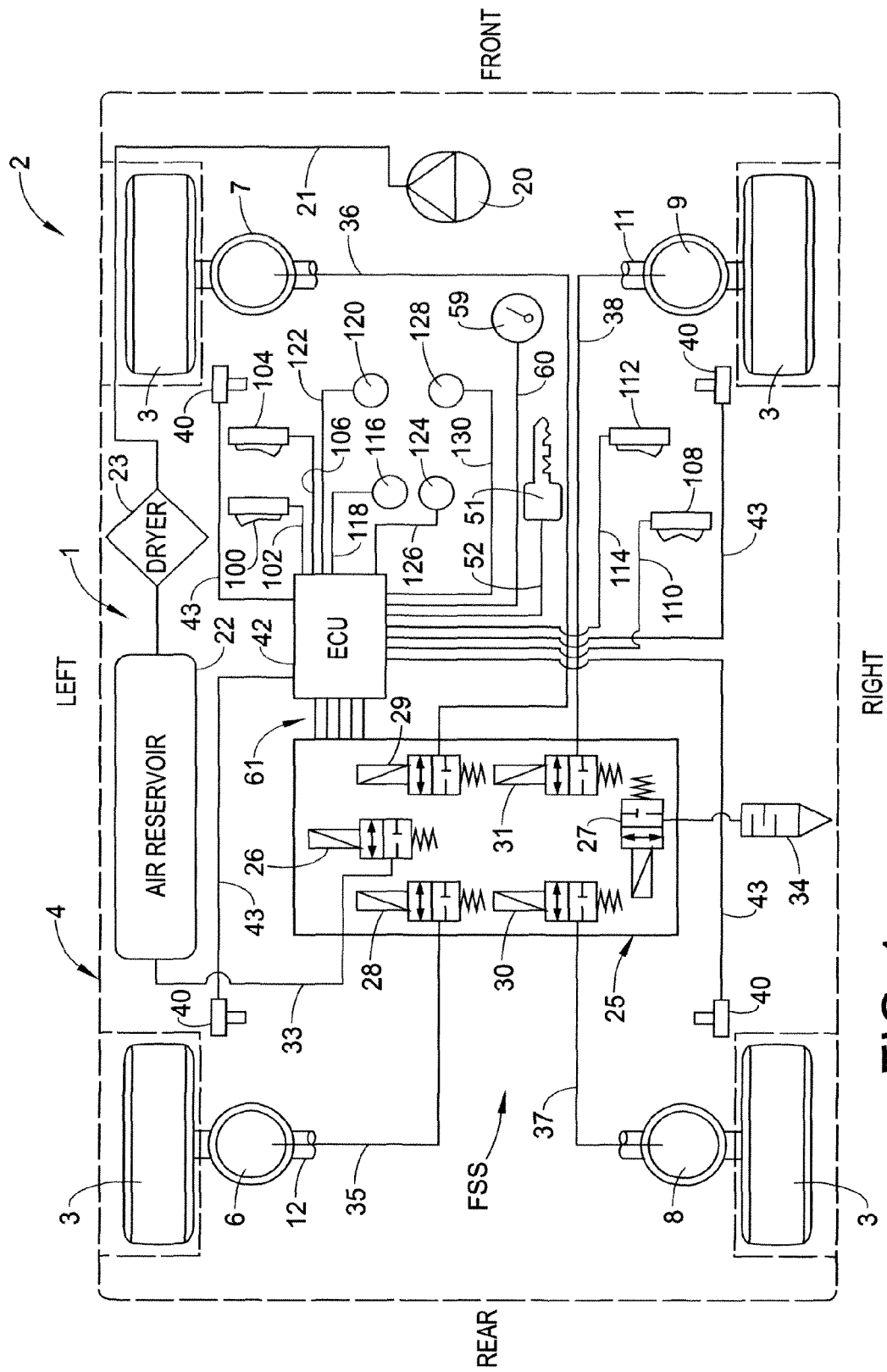
FIG. 1 is a schematic diagram of a vehicle suspension system and components thereof mounted on a traditional dual axle vehicle according to an exemplary embodiment of this disclosure.

FIG. 1 is a diagrammatic representation of an exemplary embodiment of a vehicle chassis height adjustment system of the present disclosure which is indicated generally at 1, and illustrated as being used on a vehicle 2, such as a cargo truck, for example. However, system 1 can be used on other types of vehicles such as travel trailers, over-the-road truck trailers, ambulances, and personnel transport vehicles, for example. The system can also be used on stationary equipment, such as a gun platform, for example, that is supported on fluid suspension members, such as air springs, for example. Vehicle 2 includes a plurality of wheels 3, one of which is illustrated on each corner of the vehicle, and a fluid suspension system FSS. The fluid suspension system includes air springs 6, 7, 8 and 9 mounted adjacent each wheel 3 on the ends of supporting front and rear axles 11 and 12 and supports a vehicle chassis 4 thereon. For smaller vehicles, only a single axle having a pair of air springs may be utilized. However, for most cargo trucks or other large pieces of equipment or vehicles, at least a pair of axles will be utilized having one or more air springs adjacent each end thereof.

Figure 3:
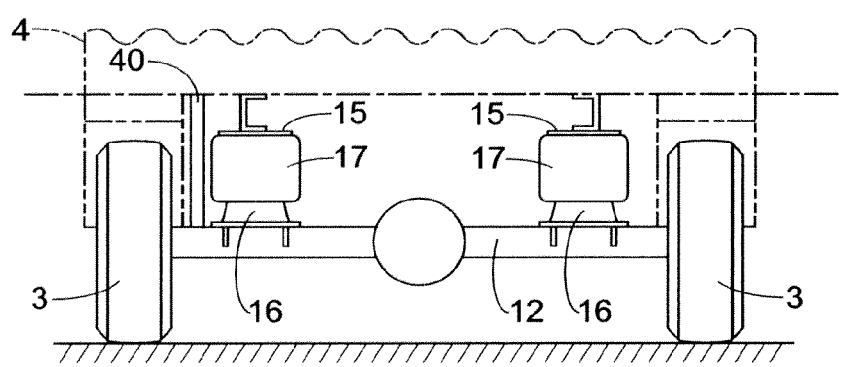
FIG. 3 is an enlarged fragmentary sectional view taken on line 6-6 in FIG. 2.

The air springs are of a usual construction having a pair of spaced end members 15 and 16 with an intervening flexible sleeve 17 forming an internal fluid chamber (see FIG. 3). Some examples of known air springs are shown in U.S. Pat. Nos. 5,374,037, 4,852,861, and 4,718,650, which are totally incorporated herein by reference. Air-over-damper type suspension members also can be used within the scope of the present disclosure, such as is shown in U.S. Pat. No. 4,712,776 and which is totally incorporated herein by reference.

Leveling system 1 includes a compressor 20, which can be electrically operated or driven by the engine of the vehicle or in another suitable manner, to supply pressurized fluid, usually air, through a supply line 21 to a reservoir or supply tank 22. It will be appreciated that such compressors are known to be operable independent of the engine of the vehicle. A dryer 23 can optionally be included and is preferably fluidically interconnected along line 21 for removing moisture from the pressurized fluid prior to entering reservoir 22. If desired, pressurized fluid can be supplied directly to the air springs from the compressor without first going to reservoir 22.

A main control valve assembly 25 includes an inlet valve 26, an exhaust valve 27 and individual air spring control valves 28, 29, 30 and 31. Inlet valve 26 is in fluid communication with reservoir 22 through fluid supply line 33 and exhaust valve 27 is in fluid communication with an exhaust silencer 34. Individual control valves 28, 29, 30 and 31 are connected in fluid communication with individual air springs 6, 7, 8 and 9, respectively, by fluid lines 35, 36, 37 and 38, respectively. It is to be understood that valve assembly 25 described above and illustrated in FIG. 1 is merely one example of a suitable valve assembly and that any other suitable arrangement can be used without departing from the principles of the present disclosure. For example, multi-position valves, such as 2-way or 3-way valves for example, could be used in place of one or more of the control valves shown and described.

Each of the air springs may have a height sensor or detector, indicated generally at 40, associated therewith that can be any one of various known constructions. Height sensors 40 can utilize Hall effect, Sonics, electromagnetic wave, infrared, resistance, or the like, that operate on, in or merely in association with the air springs and of which all are well known in the air spring art. Some examples of such air spring height detectors that are part of an air spring itself are shown in U.S.

Pat. Nos. 5,707,045, 5,229,829, and 4,798,369, which are totally incorporated herein by reference.

While the air suspension system described above, with reference to FIG. 1, includes a height sensor associated with each air spring, it is to be understood that alternative height sensing configurations are within the scope of this disclosure. For example, the system may include only one height sensor for the front vehicle springs and another for the rear vehicle springs. Such a configuration may be applicable to a relatively stiff suspension system.

Figure 2:
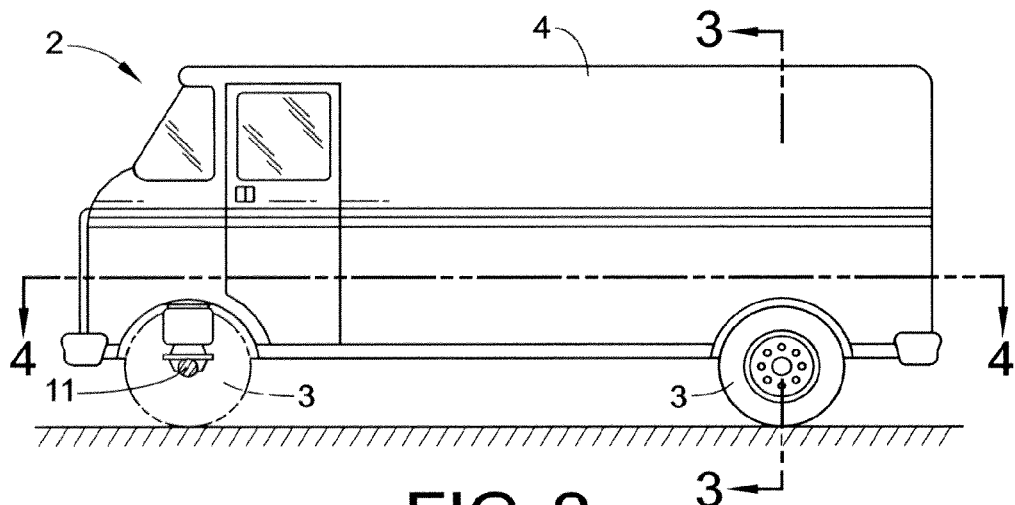
FIG. 2 is a diagrammatic side view of a vehicle to be aligned by the method and system of the present disclosure.
Figure 4:
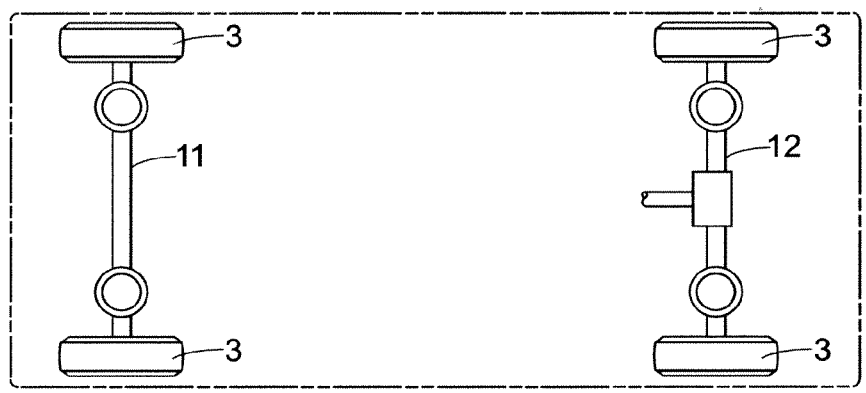
FIG. 4 is a diagrammatic view looking in the direction of line 7-7 in FIG. 2.

With reference to FIGS. 2, 3 and 4, illustrated is one exemplary application of a vehicle chassis height adjustment system according to this disclosure. FIGS. 2-4 show multiple views of a cargo type vehicle including a chassis and axle arrangement, whereby the chassis height can be adjusted by means of an air spring system as described with reference to FIG. 1.

As shown in FIG. 3, height sensor 40 can also be a separate component externally supported on the vehicle and extending between spaced-apart portions of the vehicle, such as between the axle and chassis or vehicle body, for example. Each height sensor 40 is preferably supported adjacent one of the individual air springs and is also in communication with an electronic control unit (ECU) 42, such as by a control line 43. Additionally, an end-of-travel signal can be output by the height sensors indicating that one of the extreme positions, such as fully extended or fully compressed, for example, of the associated air spring has been reached or is being approached. Alternately, end-of-travel data can be determined by the ECU based upon a comparison of the signal from the height detector with known end-of-travel values stored within the ECU. ECU 42 preferably includes a standard microchip that can be programmed by one skilled in the art to provide features, such as those discussed hereinbelow and shown in the various drawing figures.

ECU 42 is shown in FIG. 1 as being connected to chassis height selection switches 100 and 104 by control lines 102 and 106, respectively, to chassis height increment switch 108 and decrement switch 112 by control lines 110 and 114, respectively, to a key actuated vehicle ignition switch 51 by a control line 52, and to indicating lights 116, 120, 124, and 128 by control lines 118, 122, 126, and 130, respectively. Height switches 100, 104, 108 and 112 could alternately be part of a multi-position switch that is suitable for controlling the chassis alignment system, for example as adjusting or otherwise setting the height of the sprung mass of the vehicle during chassis height adjustment operations. That is, operations in which the sprung mass is positioned relative to the unsprung mass of the vehicle during dynamic operation thereof.

ECU 42 also is operatively connected to the vehicle speed indicator or speedometer 59 by a control line 60, and to the individual air spring control valves in valve control unit 25 by a plurality of control lines, indicated collectively at 61. As such, ECU 42 is adapted to selectively actuate one or more of the plurality of valves. It will be appreciated that any suitable speed or movement indicating device can be operatively connected to the ECU in addition to or as an alternative to speedometer 59.

ECU 42 is also connected to standard chassis height adjustment switches 100 and 104 in a suitable manner, such as by way of respective control lines 102 and 104, respectively. In addition, chassis height increment/decrement switches 108 and 112 are operatively connected to ECU 42 in a suitable manner, such as by way of respective control lines 110 and 114, respectively. As will be discussed in greater detail below, height increment switches 108 and 112 permit an operator to selectively increase or decrease, respectively, the height of the sprung mass of the vehicle after the same has been adjusted to a standard selected distance with height adjustment switches 100 and 104. This incremental adjustment of chassis height is performed while maintaining the sprung mass in an approximately leveled condition, relative to the unsprung mass. It will be appreciated, however, that any other suitable control device or devices could alternately be used.

It will be appreciated that the control devices discussed above can be of any suitable type, kind and/or construction. Additionally, it will be appreciated that communications to and from the various devices and components of the vehicle, such as height sensors 40, ECU 42, speedometer 59, height adjustment switches 100 and 104, and height increment/decrement switches 108 and 112, for example, can be transmitted in any suitable manner. For example, each of the devices and components can be hard-wired to one another as prescribed by each of the various systems operative on the vehicle, with the signals communicated between the devices and components along the individual wires. As an example, if five different systems of the vehicle rely upon a signal from the speedometer, five different wires may be interconnected to the speedometer to provide the signal output by the speedometer to each of the systems directly.

Alternatively, many vehicles now include a CAN bus communication system that networks the various devices and components together. Such CAN bus communications systems are well known and commonly used. These systems can include a standalone controller or alternately be integrated into another controller of the vehicle, such as ECU 42, for example. One example of a suitable standard or protocol for such systems is SAE J1939. Though, it will be appreciated that a variety of other protocols exist and could alternately be used, such as CANOpen and DeviceNET, for example.

One advantage of using a CAN bus communication system is that the actual physical wiring of the vehicle is greatly simplified. Another advantage is that the addition of a new device and/or system can be accomplished without significant physical modification of the vehicle. For example, the new system can be added to the vehicle simply by suitably mounting a new device on the vehicle, placing the device into communication with the CAN bus communication system, and making any attendant software and/or firmware modifications to the existing devices and/or components. Once installed, the new system can send and receive any other signals, information and/or data through the CAN bus communication system to operate the newly added system.

Figure 5:
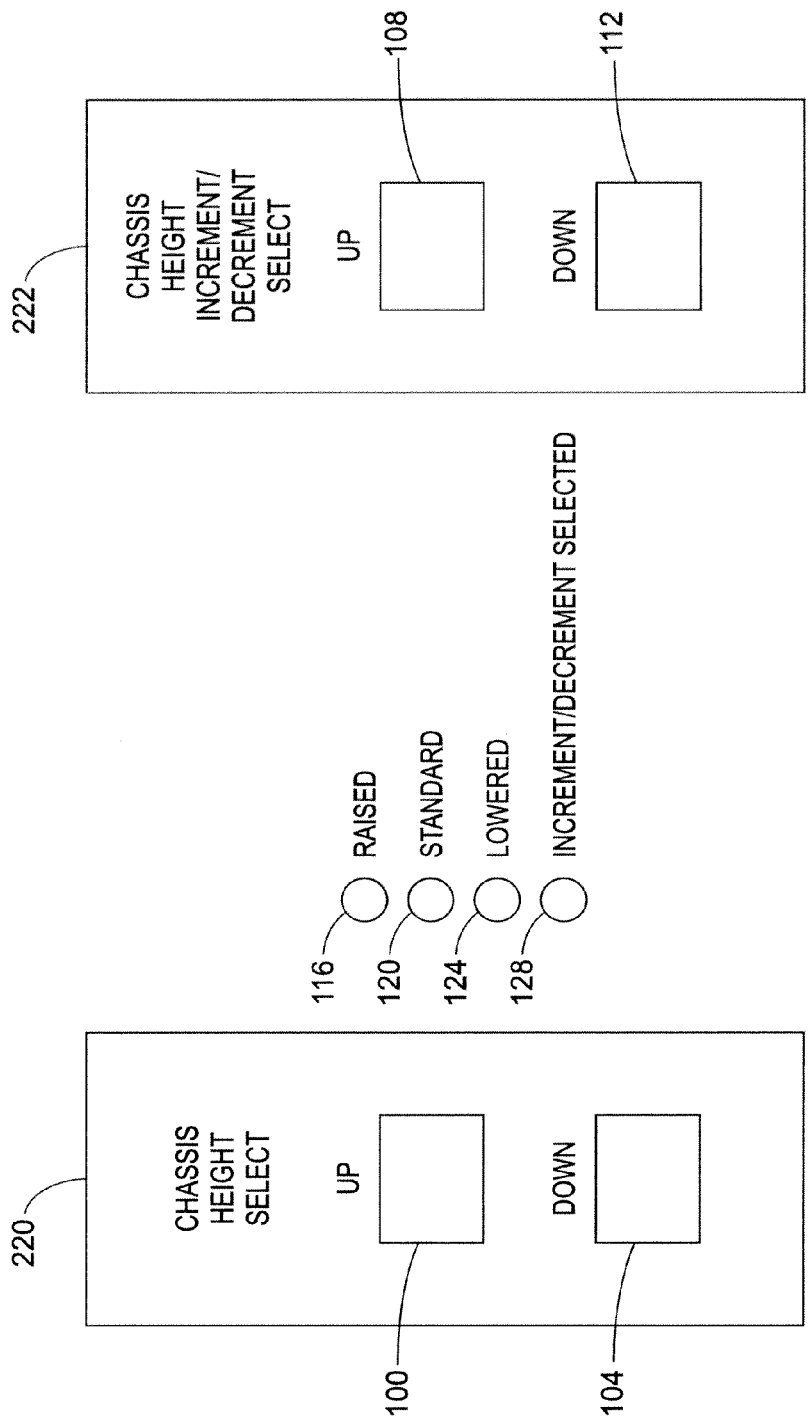
FIG. 5 illustrates a control panel according to an exemplary embodiment of this disclosure.

With reference to FIG. 5, illustrated is an exemplary operator user interface panel which includes a standard chassis height selection switch panel 220, a chassis height increment/decrement selection switch panel 222, a raised height indicator light 116, a standard height indicator light 120, a lowered height indicator light 124 and an increment/decrement height adjustment indicator light 128. The standard chassis height selection switch panel 220 includes an "up" switch 100 and a "down" switch 104. In addition, the chassis height increment/decrement select switch panel 222 includes an "up" 108 switch and a "down" 112 switch.

The operator user interface panel can be located on the dashboard of a vehicle for controlling both the ride suspension system for the vehicle during the dynamic operation thereof as well as the stationary chassis height adjustment system of the present disclosure. If desired, the panel could be a touch panel or touch screen which could eliminate the toggle or rocker switches and lights discussed above.

In addition to the hardware described for actuating a plurality of air spring assemblies to control the height of a chassis, the exemplary vehicle chassis height adjustment system 1, as described above, includes standard chassis height selection switches "up" 100 and "down" 104; and incremental/decremental height selection switches "up" 108 and "down" 112.

Indicator lights 116, 120, 120, 124 and 128 provide an operator with visual indicators to communicate the chassis is at a "raised" height, a "standard" height, a "lowered" height and/or is in the "increment/decrement" height adjustment mode.

According to one exemplary embodiment of this disclosure, the standard height is associated with a normal ride height. In other words, this is the desired height of the chassis as the vehicle travels. If the chassis height is above the standard height, the "raised" light 116 is on. If the chassis height is below the standard height, the lowered light 124 is on. If the chassis height is at the standard height, the standard light 120 is on. As will be further discussed below, the increment/decrement light 128 is on if the chassis is at a height not associated with a raised, standard or lowered predetermined height.

Figure 6:
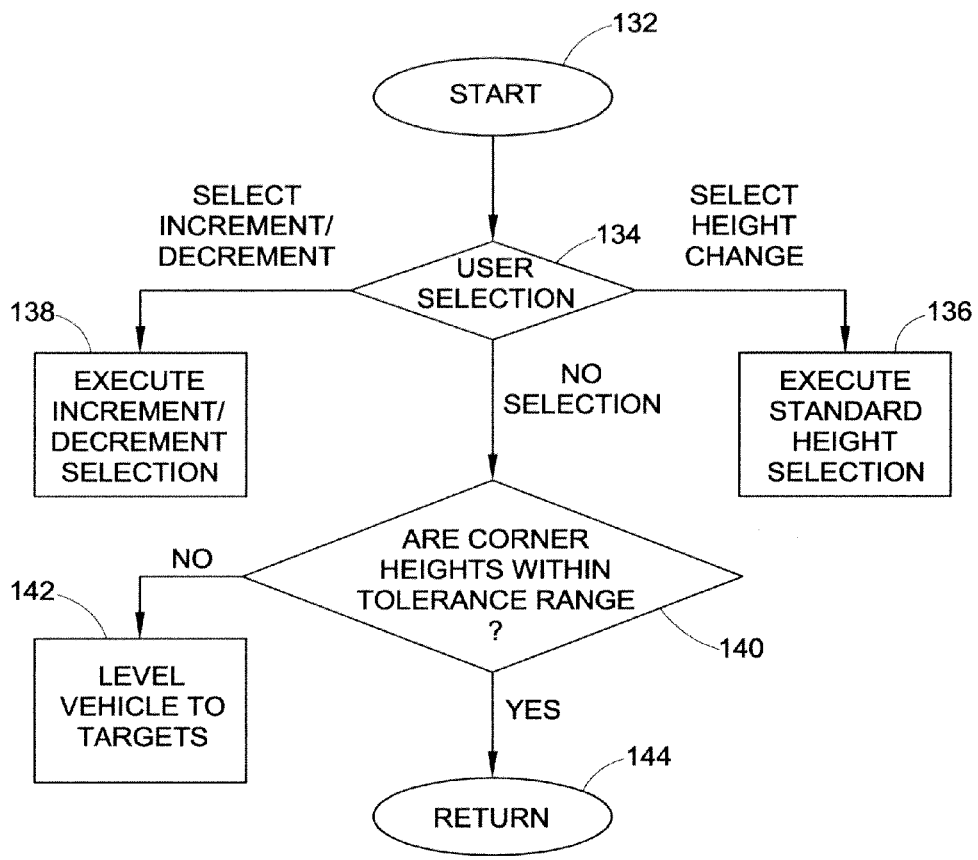
FIG. 6 is a flow diagram of one exemplary method of the present disclosure for carrying out the height adjustment of a vehicle chassis.

With reference to FIG. 6, illustrated is a flow chart representative of an algorithm to adjust the height of a vehicle chassis as illustrated in FIG. 1. The program capable of executing the algorithm may reside in the ECU.

In addition to software implementing the functionality of this disclosure the ECU would most likely also have other functionality integrated. This could include, but is not limited to, compressor control, UI reception and display, fault detection, and fault handling for a variety of other appropriate algorithms for the control of an air suspension.

Notably, before execution of the vehicle height adjustment algorithm, an operator will position a vehicle at a loading dock for loading and/or unloading of the vehicle. To properly and safely load and unload the vehicle, the operator will want to adjust the height of the chasses to closely match the height of the loading dock.

To provide height adjustment of the chassis, the program executes the following:

Initially, the chassis height adjustment routine starts 132.

Then, the program waits for an input from the operator 134 indicating whether or not the program executes a standard height adjustment 136 or an incremental/decremental height adjustment 138. If the operator does not select a standard height adjustment 136 or an incremental/decremental height adjustment 138, the program proceeds to determine if all corners of the vehicle chassis are within the tolerance range 140 associated with any previous height adjustment target. It should be understood, all height adjustments controlled are level height adjustments, which are defined as relatively equal distances from the chassis to a flat ground surface.

If the program determines no height selection has been provided by the operator and the chassis corner heights are not within a predetermined tolerance range, the program executes a routine to level the vehicle chassis 142 via the solenoid-air spring system previously described with reference to FIG. 1. If the program determines no height selection has been provided by the operator and the vehicle corner heights are within tolerance range, the program returns 144 and waits for a user selection and/or continues to monitor the chassis corner heights.

Figure 7:
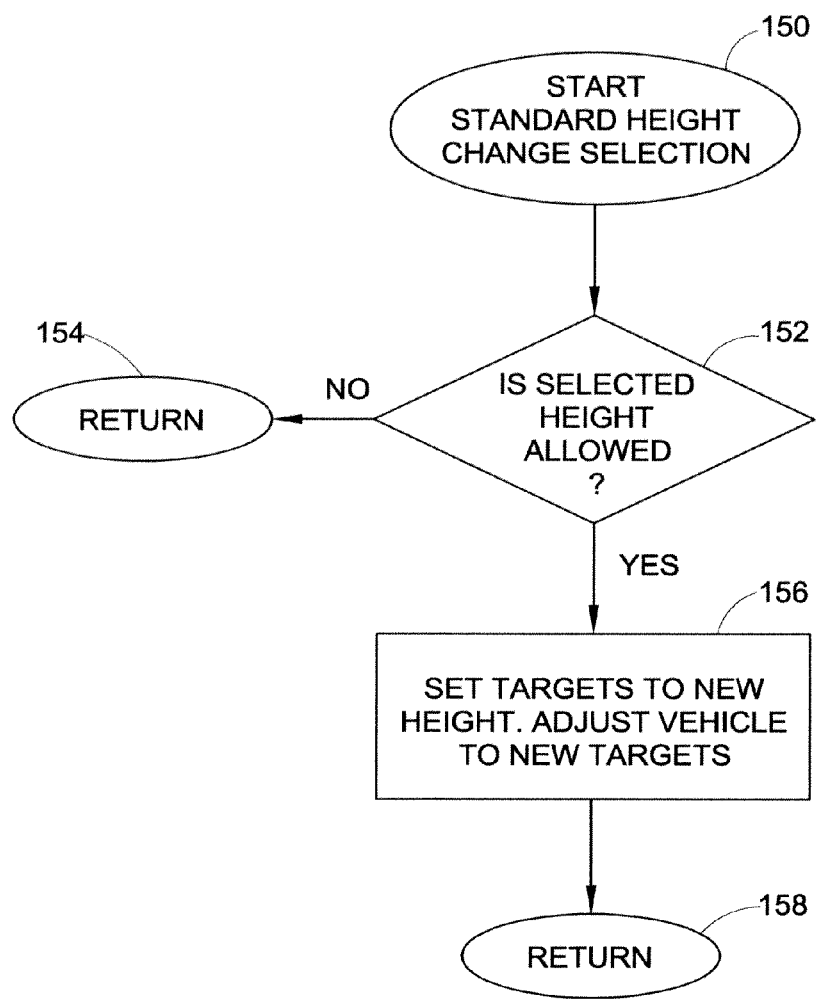
FIG. 7, is a flow diagram of one exemplary method of the present disclosure for carrying out the standard height adjustment of a vehicle chassis.

With reference to FIG. 7, illustrated is a flow chart representing an algorithm to adjust the height of the chassis to a predetermined height associated with a standard mode of operation 150.

In operation, the operator selects this mode by pressing a switch such as switch 100 or 104 to execute a chassis height adjustment up or down, respectively.

During the execution of block 152, the program determines if the selected height is allowed. In other words, the program determines if all conditions are satisfied to enable the adjustment of the chassis height. An example of such a condition would be the speed of the vehicle, whereby different heights could allowed at different speeds. The standard ride height could be allowed at all speeds while the raised predetermined height might be allowed at a speed less than 35 mph (approx 56 kph) and the lowered predetermined height might be allowed at a speed less than 5 mph (approx. 8 kph). Furthermore the incremental/decremental heights might only be allowed with the speed at 0 mph (0kph) and the parking brake set. It is understood that this is merely one example of possible conditions on which a decision is made regarding the allowance of a selection of a height and that these conditions could vary from vehicle to vehicle including the lack of restrictions on such selections if the design of the vehicle and its suspension make that feasible. Notably, the requested raised and lowered heights are preprogrammed into the exemplary system being described, where the operator pressed switch simply executes the preprogrammed height adjustments. However, it is to be understood, multiple switches or a touch screen can be incorporated into this system where an operator can select among a plurality of raised, lowered or standard chassis height positions.

If the execution of block 152 determines the selected height is not allowed, the program returns 154 to an idle state, stops or waits until a selected height is allowed. If the execution of block 152 determines the selected height is allowed, the program sets 156 the target heights associated with the air springs to the preprogrammed heights associated with the selected chassis position. Subsequently, the program executes the adjustment of the chassis height to the new target heights by means of the solenoid-air spring arrangement described with reference to FIG. 1.

After completion of the chassis height and adjustment, the program returns 158 to the appropriate state.

Figure 8:
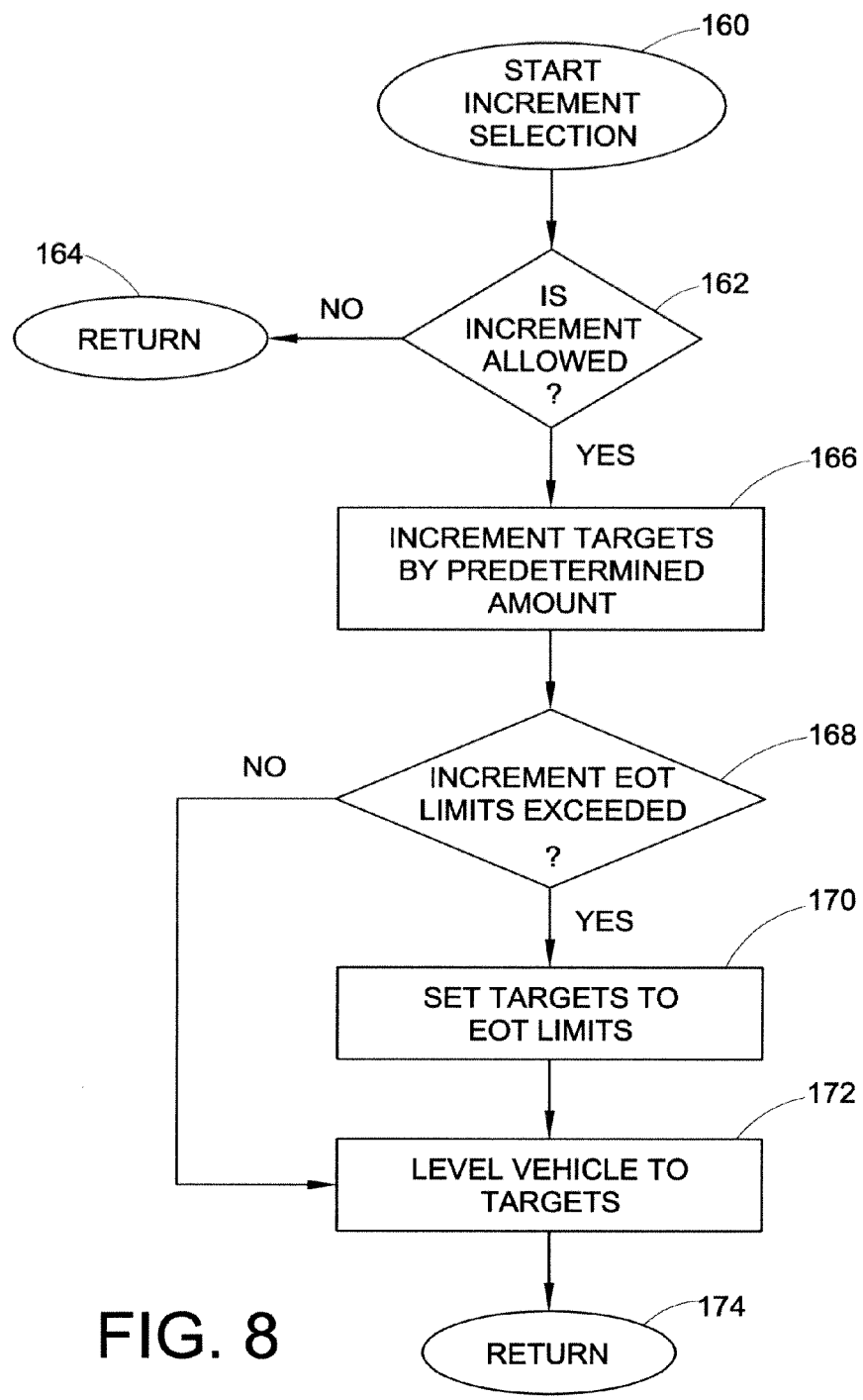
FIG. 8 is a flow diagram of an exemplary method of the present disclosure for carrying out the incremental height adjustment of a vehicle chassis.

With reference to FIG. 8, illustrated is a flow chart representative of an algorithm to execute an incremental chassis height adjustment according to an exemplary embodiment of this disclosure.

As previously discussed, a typical application associated with an incremental chassis height adjustment includes the situation where the operator of the vehicle has docked the vehicle at a dock for loading/unloading and selected, for example, the raised position for the chassis. To further adjust the height of the chassis, the operator selects the incremental height adjustment mode to raise the chassis height further and provide a smaller step between the chassis and the loading dock.

With continuing reference to FIG. 8, to execute an incremental chassis height selection 160, the program initially determines if the preprogrammed height incremental adjustment process associated with the pressed incremental switch is allowed 162. In other words, the program determines if all conditions are satisfied to enable the height adjustment of the chassis.

As previously discussed it may be desirable to only allow incremental/decremental height selection when it is guaranteed that a vehicle is stationary, for example for loading and unloading. In such a case, speed or parking brake status may be used to prevent the selection of an incremental/decremental height selection. It is understood that there are many other conditions that might be used to limit the selection of the heights. It will be appreciated that the application of other such restrictions in the selection of heights is within the scope of this disclosure.

If the incremental chassis height adjustment is not allowed, the program returns 164 as previously discussed. Otherwise, the program determines the requested incremental height adjustment is allowed and proceeds to block 166, where the target heights associated with each air spring assembly are incremented a preprogrammed distance associated with pressing the increment switch. Notably, the exemplary embodiment being described is limited to a single predetermined distance associated with the operator pressing the increment switch, however, a plurality of switches or a touch screen can be provided where a plurality of incremental heights are provided to the operator.

After incrementing the target heights of the plurality of air springs 166, the program determines 168 if the EOT (End of Travel) limits associated with the air springs have been exceeded, which would limit further incremental height adjustment of the chassis.

If the EOT limits have not been exceeded, the program proceeds to block 172, where the vehicle chassis height is adjusted by means of the air springs.

If the EOT limits have been exceeded by the new incremented target heights, then the program sets 170 the target heights to the EOT limits and proceeds to block 172 to adjust the chassis height to the target heights.

After incrementally adjusting the chassis height, the program returns 174 as previously discussed.

Figure 9:
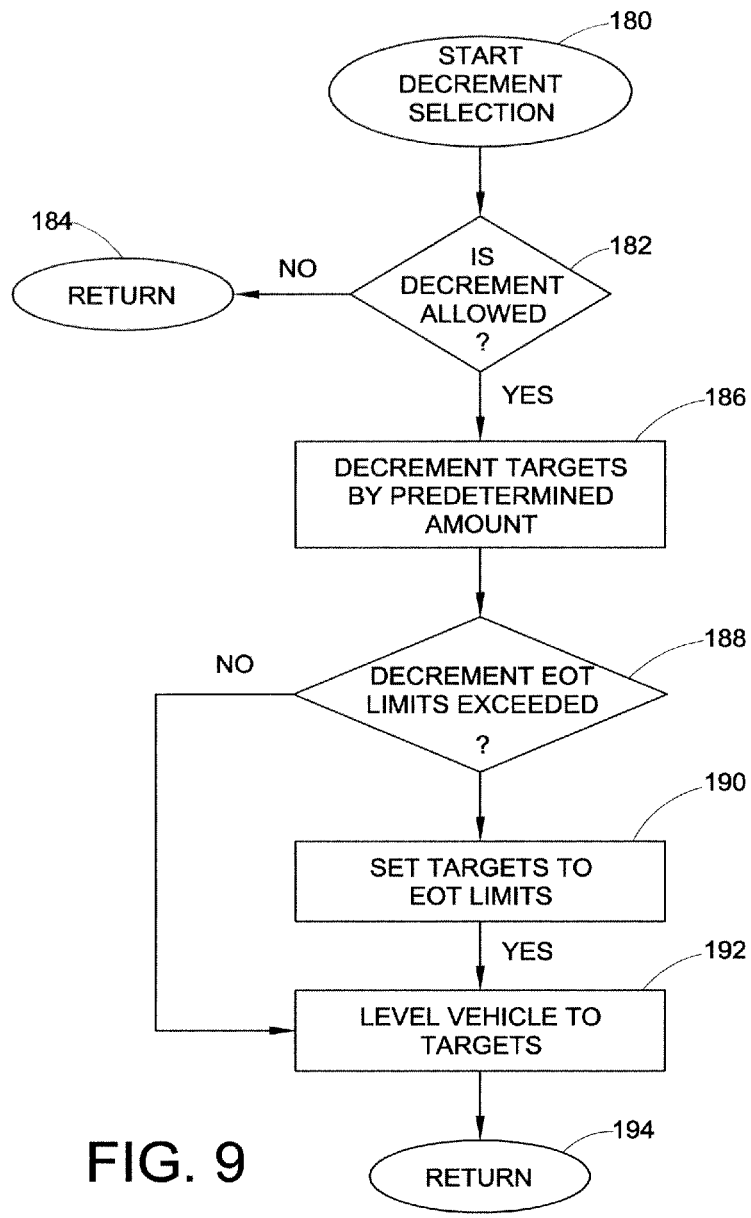
FIG. 9 is a flow diagram of one exemplary method of the present disclosure for carrying out the decremental height adjustment of a vehicle chassis.

With reference to FIG. 9, illustrated is a flow chart representative of an algorithm to execute a decremental chassis height adjustment according to an exemplary embodiment of this disclosure.

As previously discussed, one typical application associated with the decremental chassis height adjustment includes the situation where the operator of the vehicle has docked the vehicle at a dock for loading/unloading. To facilitate loading/unloading of the vehicle, the operator lowers the height of the chassis to a predetermined distance by means of the standard chassis height selection system. To further adjust the height of the chassis, the operator selects the decremental height adjustment mode to lower the chassis height further and provide a smaller step between the chassis and the loading dock.

With continuing reference to FIG. 9, to execute a decremental chassis height selection 180, the program initially determines if the preprogrammed height decremental adjustment process associated with the pressed decremental switch is allowed 182. In other words, the program determines if all conditions are satisfied to enable the height adjustment of the chassis.

Several possible conditions exists which may be used to determine whether a decrement meets these conditions. Restrictions may even vary with height as heights near the normal ride height may have fewer restrictions than heights further from the standard ride height. These conditions can include speed and parking brake status.

If the decremental chassis height adjustment is not allowed, the program returns 184 as previously discussed. Otherwise, the program determines the requested decremental height adjustment is allowed and proceeds to block 186, where the target heights associated with each air spring assembly are decremented a preprogrammed distance associated with pressing the decrement switch. Notably, the exemplary embodiment being described is limited to a single predetermined distance associated with the operator pressing the decrement switch, however, a plurality of switches or a touch screen can be provided where a plurality of decremental heights are provided to the operator.

After decrementing the target heights of the plurality of air springs 186, the program proceeds to determine 188 if the EOT (End of Travel) limits associated with the air springs have been exceeded, which would further limit the decremental height adjustment of the chassis.

If the EOT limits have not been exceeded, the program proceeds to block 192, where the vehicle chassis height is adjusted by means of the air spring.

If the EOT limits have been exceeded by the new decremented target heights, then the program sets 190 the target heights to the EOT limits and proceeds to block 192 to adjust the chassis height to the target heights.

After decrementally adjusting the chassis height, the program returns 194 as previously discussed.

Figure 10:
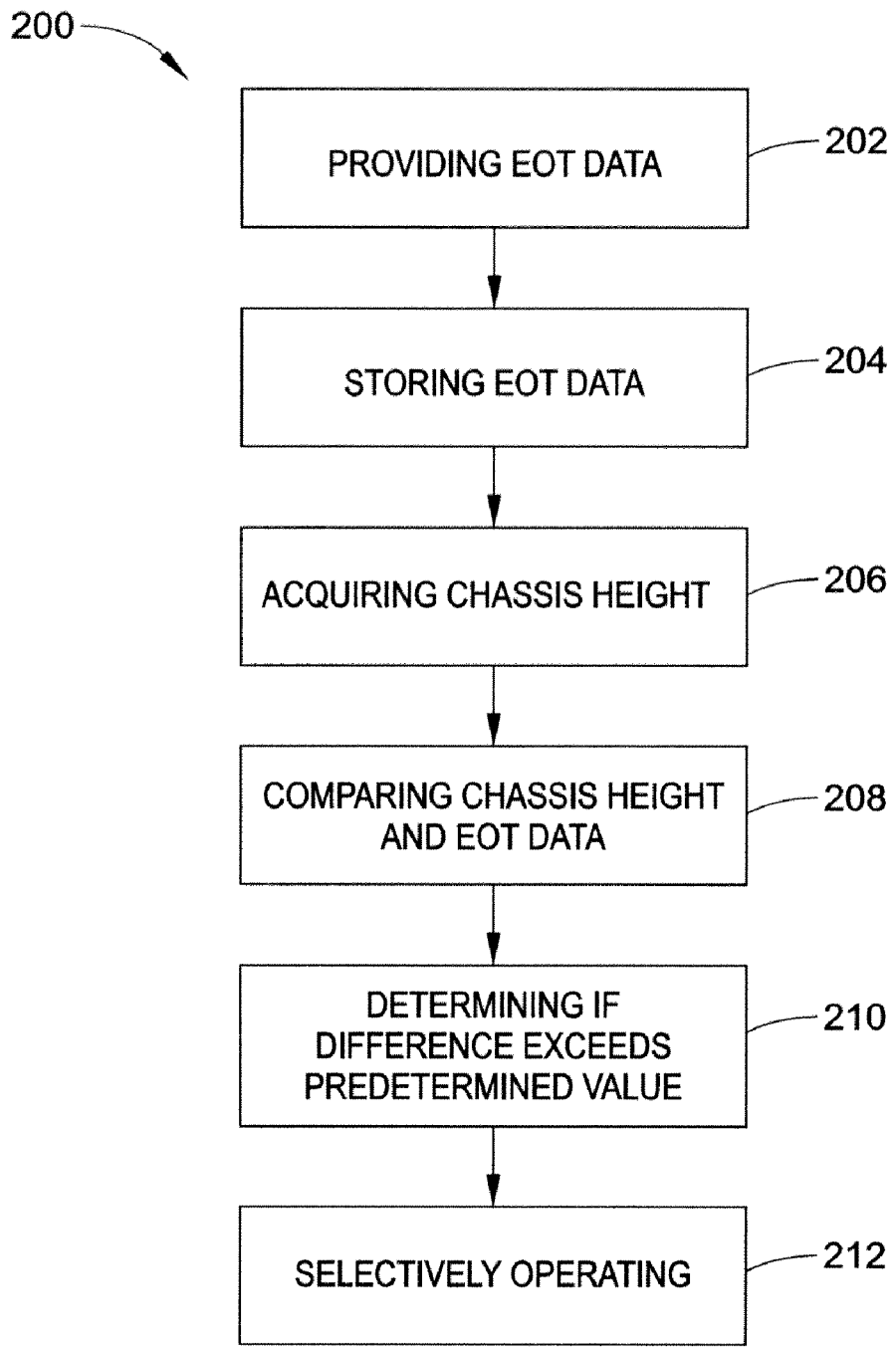
FIG. 10 is a flow diagram of one exemplary method of determining if a height adjustment of a vehicle chassis is within the capability of a suspension system.

With reference to FIG. 10, illustrated is another exemplary method of executing an end-of-travel (EOT) routine 200. The method includes providing end-of-travel data 202, such as from the height sensor, for example, indicative of one of the extreme positions of an air spring. Next, the method stores the end-of-travel data 204 in an ECU. Next, the routine acquires the present chassis height 206 and compares 208 the chassis height with the EOT data. Next, if the difference between the chassis height and the end-of-travel data exceeds a predetermined value 210 the control device selectively 212 discontinues pressurized fluid flow to stop any further chassis height adjustment.

It will be appreciated that the height adjustments discussed herein can be accomplished in any manner suitable for adjusting the height of a the vehicle body or chassis. For example, to raise or lower the sprung mass of a vehicle a desired amount, each of the fluid suspension members could be approximately simultaneously vented or filled by the same amount to effect the height change. Preferably, however, each of the fluid suspension members are separately inflated or deflated by the desired amount. In one exemplary embodiment, the fluid suspension members are selected to be filled or vented in an order that approximately corresponds to the amount of travel in the direction of desired movement. In this embodiment, the fluid suspension member with the greatest amount of travel will be adjusted first, followed by the fluid suspension member with the next greatest amount of travel, and so on. Regardless of the adjustment manner that is used, it is desirable to adjust the fluid suspension members in increments that are sufficiently small that the approximate alignment of the sprung mass of the vehicle can be maintained.

The control system of the present disclosure also is provided with suitable interlocks that act to selectively deactivate at least a portion of the chassis height adjustment system and returns the system to the normal ride height leveling. Also, speedometer 59 and/or another suitable movement-sensing component is preferably connected with ECU 42, such as through line 60, for example, to further signal ECU 42 to selectively deactivate the chassis height adjustment system upon the vehicle being put into motion. Thus, where the speedometer or other device outputs a signal indicative of a speed greater than about zero (0) mph, one or more functions of the ECU can be deactivated. Also, leaving "Park" or releasing the emergency brake could optionally signal ECU 42 to disengage one or more functions of the chassis height adjustment system. As discussed above, the system initially attempts to adjust the height of the vehicle by exhausting air from the high side or end air springs to conserve the stored pressurized fluid in the reservoir 22. However if necessary, air can be supplied to the appropriate air springs from reservoir 22 through the appropriate individual control valves 28-31 to raise that portion of the vehicle body to compensate for any misalignment if necessary and/or if desired.

It is readily understood that air suspension ride systems, other than that shown in FIG. 1, could be utilized and are within the scope of this disclosure. Furthermore, the present system can be used on stationary equipment other than vehicles, and the air springs replaced with hydraulic pressure members, etc.

While the disclosure has been described with reference to the foregoing embodiments and considerable emphasis has been placed herein on the structures and structural interrelationships between the component parts of the embodiments disclosed, it will be appreciated that other embodiments of the disclosure can be made and that many changes can be made in the embodiments illustrated and described without departing from the principles of the disclosure. Obviously, modifications and alterations will occur to others upon reading and understanding the preceding detailed description. Accordingly, it is to be distinctly understood that the foregoing descriptive matter is to be interpreted merely as illustrative of the present disclosure and not as a limitation. As such, it is intended that the disclosure be construed as including all such modifications and alterations insofar as they come within the scope of the appended claims.

The invention claimed is:

1. A method of adjusting and maintaining a loading height of a stationary vehicle while a load supported by a sprung mass associated with the vehicle varies, the sprung mass supported by a suspension system on an unsprung mass, the height of the suspension system selectively adjustable using a control system that is operable in an operator initiated standard height adjustment mode in which the height of the sprung mass is adjusted to a first target height, relative to the unsprung mass, selected from a plurality of operator selectable target heights, and an operator initiated incremental/decremental height adjustment mode in which the height of the sprung mass is adjusted to an incremental/decremental target height above or below, respectively, the selected target height associated with the standard height adjustment mode, the method comprising:
   a) entering the operator initiated standard height adjustment mode;
   b) receiving a first target height datum associated with an operator selection from a plurality of predetermined target heights which represent a plurality of operator selectable sprung mass heights relative to the unsprung mass;
   c) receiving actual height data from one or more height sensors operatively connected to the sprung mass and unsprung mass for determining the height of the sprung mass relative to the unsprung mass;
   d) adjusting the sprung mass from the actual height to the first target height;
   e) entering the operator initiated incremental/decremental height adjustment mode;
   f) receiving a first incremental/decremental target height datum which represents a target height above or below the first target height of the sprung mass relative to the unsprung mass;
   g) adjusting the sprung mass to a second target height substantially equivalent to the sum of the first target height and the first incremental/decremental target height; and
   h) maintaining the sprung mass at the second target height while the vehicle is stationary and the load supported by the sprung mass varies.

2. The method of adjusting a height of a vehicle according to claim 1, further comprising:
   g1) receiving a second incremental/decremental target height datum which represents a target height above or below the second target height of the sprung mass relative to the unsprung mass;
   g2) adjusting the sprung mass to a third target height substantially equivalent to the sum of the second target height and the second incremental/decremental target height; and
   h) maintaining the sprung mass at the third target height while the vehicle is stationary and the load supported by the sprung mass varies.

3. The method of adjusting a height of a vehicle according to claim 2, further comprising: performing steps g1) and g2) until an operator desired vehicle height is obtained, wherein the operator desired vehicle height is associated with a final target height; and
   h) maintaining the sprung mass at the final target height while the vehicle is stationary and the load supported by the sprung mass varies.

4. The method of adjusting a height of a vehicle according to claim 3, step h) comprising:
   h1) receiving the actual height data from one or more height sensors operatively connected to the sprung mass and unsprung mass for determining the height of the sprung mass relative to the unsprung mass;
   h2) comparing the actual height data to the final target height;
   h3) adjusting the sprung mass to the final target height if the comparison in step h2) yields a difference greater than a predetermined allowable height difference error value.

5. The method of adjusting a height of a vehicle according to claim 4, further comprising:
   i) entering the standard height adjustment mode;
   j) a receiving a normal ride target height datum which represents a predetermined sprung mass height relative to the unsprung mass for substantially horizontal vehicle movement; and
   k) adjusting the sprung mass to the normal ride target height.

6. The method of adjusting a height of a vehicle according to claim 1, wherein the suspension system has one or more front height sensors and respective fluid suspension members operatively connected to a portion of the suspension system associated with the front of the vehicle, and one or more back height sensors and respective fluid suspension members operatively connected to a portion of the suspension system associated with the front of the vehicle, step d) further comprising:
   if the difference between the front and the first target height is greater than or equal to the difference between the rear and the first target height, adjusting the sprung mass associated with the front of the vehicle to the first target height before adjusting the sprung mass associated with the rear of the vehicle, otherwise, adjusting the sprung mass associated with the rear of the vehicle to the first target height before adjusting the sprung mass associated with the front of the vehicle.

7. A vehicle suspension system operatively disposed between an associated sprung mass and an associated unsprung mass of an associated vehicle, comprising:
   a plurality of fluid suspension members supported between the associated sprung and unsprung masses;
   a pressurized fluid source in fluid communication with said plurality of fluid suspension members;

a control device fluidically disposed between the pressurized fluid source and the plurality of fluid suspension members and operative to selectively transfer pressurized fluid therebetween;

one or more height sensors operatively connected between the associated sprung and unsprung masses and operative to output a signal indicative of a distance therebetween; and a control system in communication with at least the control device and the one or more height sensors, the control system configured to operate the vehicle suspension system in an operator initiated standard height adjustment mode and an operator initiated incremental height adjustment mode, the operator initiated standard height adjustment mode configured to a) receive a first target height datum associated with an operator selection from a plurality of predetermined target heights which represent a plurality of operator selectable sprung mass heights relative to the unsprung mass;

b) receive actual height data from the one or more height sensors;

c) adjust the sprung mass from the actual height to the first target height by controlling the respective fluid suspension members, and the incremental/decremental height adjustment mode configured to d) receive a first incremental/decremental target height datum which represents a target height above or below the first target height at the sprung mass relative to the unsprung mass; and e) adjust the sprung mass to a second target height substantially equivalent to the sum of the first target height and the first incremental/decremental target height by controlling the respective fluid suspension members, wherein the control system maintains the sprung mass at the second target height while the vehicle is stationary and the load supported by the sprung mass varies.

8. The vehicle suspension system according to claim 7, wherein the incremental/decremental height adjustment mode is configured to f) receive a second incremental/decremental target height datum which represents a target height above or below the second target height of the sprung mass relative to the unsprung mass; and g) adjust the sprung mass to a third target height substantially equivalent to the sum of the second target height and the second incremental/decremental target height, wherein the control system maintains the sprung mass at the third target height while the vehicle is stationary and the load supported by the sprung mass varies.

9. The vehicle suspension system according to claim 8, the control system configured to iteratively perform steps f) and g) until an operator desired vehicle height is obtained, wherein the operator desired vehicle height is associated with a final target height, wherein the control system maintains the sprung mass at the final target height while the vehicle is stationary and the load supported by the sprung mass varies.

10. The vehicle suspension system according to claim 9, wherein the control system is configured to receive actual height data from the one or more height sensors, compare the actual height data to the final target height, and adjust the sprung mass to the final height if the comparison yields a difference greater than a predetermined allowable height difference error value.

11. The vehicle suspension system according to claim 7, wherein the suspension system has one or more front height sensors and respective fluid suspension members operatively connected to a part of the suspension system associated with the front of the vehicle, and one or more back height sensors and respective fluid suspension members operatively connected to a part of the suspension system associated with the front of the vehicle.

12. The vehicle suspension system according to claim 11, wherein the control system is configured to adjust the sprung mass associated with the front of the vehicle to the first target height before adjusting the sprung mass associated with the rear of the vehicle, if the difference between the front and the first target height is greater than or equal to the difference between the rear and the first target height, otherwise, the control system adjusts the sprung mass associated with the rear of the vehicle to the first target height before adjusting the sprung mass associated with the front of the vehicle.

13. The vehicle suspension system according to claim 7, further comprising:

an operator interface operatively connected to the control system.

14. The vehicle suspension system according to claim 13, wherein the operator interface is configured to provide an input to the control system to select the first target height.

15. The vehicle suspension system according to claim 14, wherein the operations interface is configured to provide an input to the control system to select the first incremental/decremental target height.

\* \* \* \* \*